United States Patent [19]
Bross et al.

[11] Patent Number: 5,968,425
[45] Date of Patent: Oct. 19, 1999

[54] METHODS FOR THE CONTINUOUS PRODUCTION OF PLASTIC SCINTILLATOR MATERIALS

[75] Inventors: Alan Bross, Downers Grove; Anna Pla-Dalmau, Naperville; Kerry Mellott, Malta, all of Ill.

[73] Assignee: The United States of America as represented by the United States Department of Energy, Washington, D.C.

[21] Appl. No.: 08/958,815

[22] Filed: Oct. 28, 1997

[51] Int. Cl.⁶ .............................. B29B 7/00; C09K 11/06
[52] U.S. Cl. ............... 264/21; 252/301.17; 252/301.35; 264/85; 264/129; 264/141
[58] Field of Search .................... 264/141, 131, 264/176.1, 177.1, 211, 85, 1.29, 21, 129; 252/301.17, 301.35

[56] References Cited

U.S. PATENT DOCUMENTS

| | | | |
|---|---|---|---|
| 3,886,082 | 5/1975 | Hyman, Jr. ................... | 252/301.2 R |
| 4,495,084 | 1/1985 | Shimizu et al. ............... | 252/301.17 |
| 4,578,213 | 3/1986 | Simonetti .................... | 252/301.17 |
| 4,594,179 | 6/1986 | Harrah et al. ................ | 252/301.17 |
| 4,713,198 | 12/1987 | Simonetti ................... | 252/301.17 |
| 5,110,500 | 5/1992 | Walker ...................... | 252/301.16 |
| 5,236,649 | 8/1993 | Hall et al. ................. | 264/130 |
| 5,496,502 | 3/1996 | Thomson .................... | 252/301.17 |
| 5,587,112 | 12/1996 | Kauffman et al. ............ | 252/589 |
| 5,606,638 | 2/1997 | Tymianski et al. ........... | 385/143 |
| 5,688,449 | 11/1997 | Fox ......................... | 264/54 |

*Primary Examiner*—Jan H. Silbaugh
*Assistant Examiner*—Mark Eashoo

[57] ABSTRACT

Methods for producing plastic scintillating material employing either two major steps (tumble-mix) or a single major step (inline-coloring or inline-doping). Using the two step method, the polymer pellets are mixed with silicone oil, and the mixture is then tumble mixed with the dopants necessary to yield the proper response from the scintillator material. The mixture is then placed in a compounder and compounded in an inert gas atmosphere. The resultant scintillator material is then extruded and pelletized or formed. When only a single step is employed, the polymer pellets and dopants are metered into an inline-coloring extruding system. The mixture is then processed under a inert gas atmosphere, usually argon or nitrogen, to form plastic scintillator material in the form of either scintillator pellets, for subsequent processing, or as material in the direct formation of the final scintillator shape or form.

26 Claims, 2 Drawing Sheets

METHODS FOR THE CONTINUOUS PRODUCTION OF PLASTIC SCINTILLATOR MATERIALS

The United States Government has rights in this invention pursuant to Contract No. DE-AC02-76CHO3000 between the U.S. Department of Energy and the University Research Association.

BACKGROUND OF THE INVENTION

This invention relates to improved methods for producing plastic scintillator material. Simply stated scintillator is a material that converts energy into light. Energy is deposited into the scintillator by penetrating radiation. This energy is then converted into ultra-violet or visible light which can then be detected with the use of a photodetector such as a photomultiplier tube. Generally, incident penetrating radiation includes high energy particles and ionizing radiation such as x-rays, gamma-rays, alpha particles, beta particles, thermal neutrons, etc.

Standard plastic scintillator consists of a polymer matrix typically doped with two fluorescent organic compounds, a primary dopant and a secondary dopant. Solutions of a polymer and an efficient fluorescent dopant can give a system with close-to-unity quantum yield, a high-efficiency scintillator. The term quantum yield is defined as the probability that an excited state in the polymer leads to the emission of a photon by a dopant, which is generally an organic compound. In Förster's theory of nonradiative energy transfer between molecules in solution, the energy transfer is described by a dipole-dipole interaction in which nonradiative energy transfer occurs between the first excited $\pi$-singlet state of the solvent and the solute(dopant) in the ground state. The strength of this interaction is a function of the natural fluorescence lifetime of the solvent and the mean separation between the solvent and the solute molecule. Fluorescence is defined as the emission of a photon by a molecular transition from the molecule's first excited singlet state to its ground state. At high dopant concentrations (approximately 1% by weight), this process can dominate the emission or quenching process of the solvent. If the dopant's radiative quantum yield is close to unity, the number of photons emitted per solvent-molecule $\pi$-electron excitation can approach one even though the radiative quantum yield of the solvent is small (in the case of polystyrene, for example, 0.07).

Dopants that couple to the primary excitation of the solvent are called primary dopants. The primary dopant serves to raise the photon yield of the solvent plus dopant(s) combination (the number of photons emitted per unit energy deposited in the solvent) and to shift the mean wavelength of the final fluorescence of the scintillator to longer wavelengths. The addition of secondary dopants, in low concentrations (approximately 0.01% to 0.2% by weight), to the binary system of solvent and primary dopant results in the shifting of the fluorescence wavelength further to the red portion of the spectrum. Secondary dopants do not increase the intrinsic photon yield of the scintillator. However, by shifting the fluorescence emission to a longer wavelength, more photons escape from the scintillator since self-absorption by the scintillator is reduced. The term "technical quantum yield" is often applied to scintillators of finite size. In this case, effects of self-absorption are included in the determination of quantum or detected photon yield of the scintillator.

The most commonly used polymer bases in plastic scintillator are polystyrene and poly(vinyltoluene). Monomeric styrene is a liquid which polymerizes on heating to form the solid plastic polystyrene. When doping of the polystyrene or some alternate polymer matrix is required, several methods are available including:

1. dissolving the dopant in molten polystyrene,
2. polymerizing a styrene-dopant solution at a low temperature (50° C.) with a benzoyl peroxide catalyst,
3. polymerizing a styrene-dopant solution at a medium temperature (125–140° C.) over several days without a catalyst,
4. polymerizing a styrene-dopant solution at a high temperature (200° C.) without a catalyst for a period of 12–15 hours.

Method 2 was found to impair the transparency and to reduce the efficiency of the scintillator.

The size of the plastic scintillator frequently dictates the production method used. For small samples, the monomer is generally subjected to numerous vacuum distillation processes to remove inhibitors. The monomer is then transferred to a vial containing the dopant. The vial is connected to a vacuum system, and the dissolved gas is removed by repeated freeze-pump-thaw cycles. The evacuated vial is sealed, shaken to insure the complete dissolution of the dopant in the monomer, and then placed in an oil bath at 125° C. for several days. For larger specimens, a generally employed technique is to bubble nitrogen through the monomer to expel the oxygen and then mix in the dopant. The solution is then heated and the polymerization is carried out in a nitrogen atmosphere. For high temperature polymerization, the vacuum-distilled monomer and the dopant are placed in a reaction flask fitted with a reflux condenser and flushed with nitrogen for approximately thirty minutes after which the container is evacuated and sealed. The container is then heated in a bath to over 200° C. for a period of from eight to ten hours.

Typically, the technique for the preparation of plastic scintillators is:

1. purification of the monomer by vacuum distillation;
2. addition of dopants to monomer;
3. removal of dissolved gasses, notably oxygen;
4. complete polymerization in an inert atmosphere or under vacuum; and
5. careful annealing.

Applicants produce plastic scintillator using two new methods. In the first method, the plastic scintillator material is produced by combining polystyrene pellets, which have been purged with an inert gas, with oil, and then mixing in the dopants. Mineral oil was used with some success; however, significantly better results were achieved when silicone oil was used as a plasticizing agent to coat the polymer with dopant during mixing. The preferred silicone oil is an aromatic-substituted silicone. The pellet-oil-dopant combination is compounded or processed in an inert gas atmosphere, argon or nitrogen, to generate plastic scintillating material that can then be pelletized. These scintillator pellets can subsequently be extruded, injection molded and/or exposed to other plastic molding processes to form a scintillator piece of a particular shape or form. This process can also directly extrude or scintillating fibers, sheet, or film from the melt, thus avoiding the pelletizing of the new scintillating plastic. By purging the initial polymer pellet stock with argon, the water and oxygen are driven out of the pellets. This and the subsequent use of argon or nitrogen in the processing of the mixture eliminate or reduce the need for a vacuum.

In the second method for producing plastic scintillator material, the need for pre-mixing a polymer-pellet oil dopant combination is eliminated by using an inline coloring and compounding extrusion process. In this method the polymer pellets and all additives (dopants, silicone oil if desired, etc.) are metered into the processing device and again a plastic scintillator material is produced. The use of an inert gas purge is also incorporated in this method. Scintillator profiles, sheet, film, fiber can be directly produced by this method or the scintillator material can be pelletized for subsequent plastic forming operations.

Applicants' processes produce a plastic scintillating material which exhibits a very uniform distribution at the molecular level; essentially, a uniform solution of the solutes "dopants" in the solvent "polymer". The uniform distribution at the molecular level is necessary for the scintillation mechanism to function reliably.

Until now, the production of high light yield scintillators was limited to relatively slow methods as described by the prior art; however, applicants' methods produce plastic scintillating material using a continuous process that can operate over a wide range of production rates.

Thus, one object of this invention is to produce a plastic scintillating material with uniform solute-solvent distribution at the molecular level using commercial processes that can accomplish this at high rate (hundreds of pounds per hour) and in a continuous process as opposed to a bulk or batch process.

Another object of this invention is to employ an inert gas blanket before and during extrusion to expel the water and oxygen, and to prevent unwanted interactions with the polymer and the resulting scintillator reducing, thus, the need for a vacuum.

Another object of this invention, in the first method, is the implementation of silicone oil as the plasticizing agent to uniformly and homogeneously disperse the scintillation dopants into the polymer. When mineral oil is used, it tends to discolor the scintillator and consequently reduces the light yield of the scintillator.

Additional advantages, objects and novel features of the invention will become apparent to those skilled in the art upon examination of the following and by practice of the invention.

SUMMARY OF THE INVENTION

To achieve the foregoing and other advantages, this invention comprises methods for making plastic scintillating material including employing silicone oil as a plasticizing agent to uniformly and homogeneously coat the polymer with the dopants and then processing said mixture to mix the components at the molecular level. The subject invention, also, includes the implementation of an inert gas blanket, preferably argon, with respect to the initial polymer and the combination of the polymer and the dopant during processing of the mixture to produce a plastic scintillating material. In the alternative, plastic scintillating material is produced by metering a dopant combination, a plurality of polymer pellets together with a regulated stream of inert gas, preferably argon, into a processing apparatus, usually a compounder. The polymer-dopant mixture is compounded in an inert gas atmosphere to produce a plastic scintillating material.

BRIEF DESCRIPTION OF THE DRAWINGS

The present invention is illustrated in the accompanying drawing where.

DETAILED DESCRIPTION OF THE INVENTION

Figure 1:
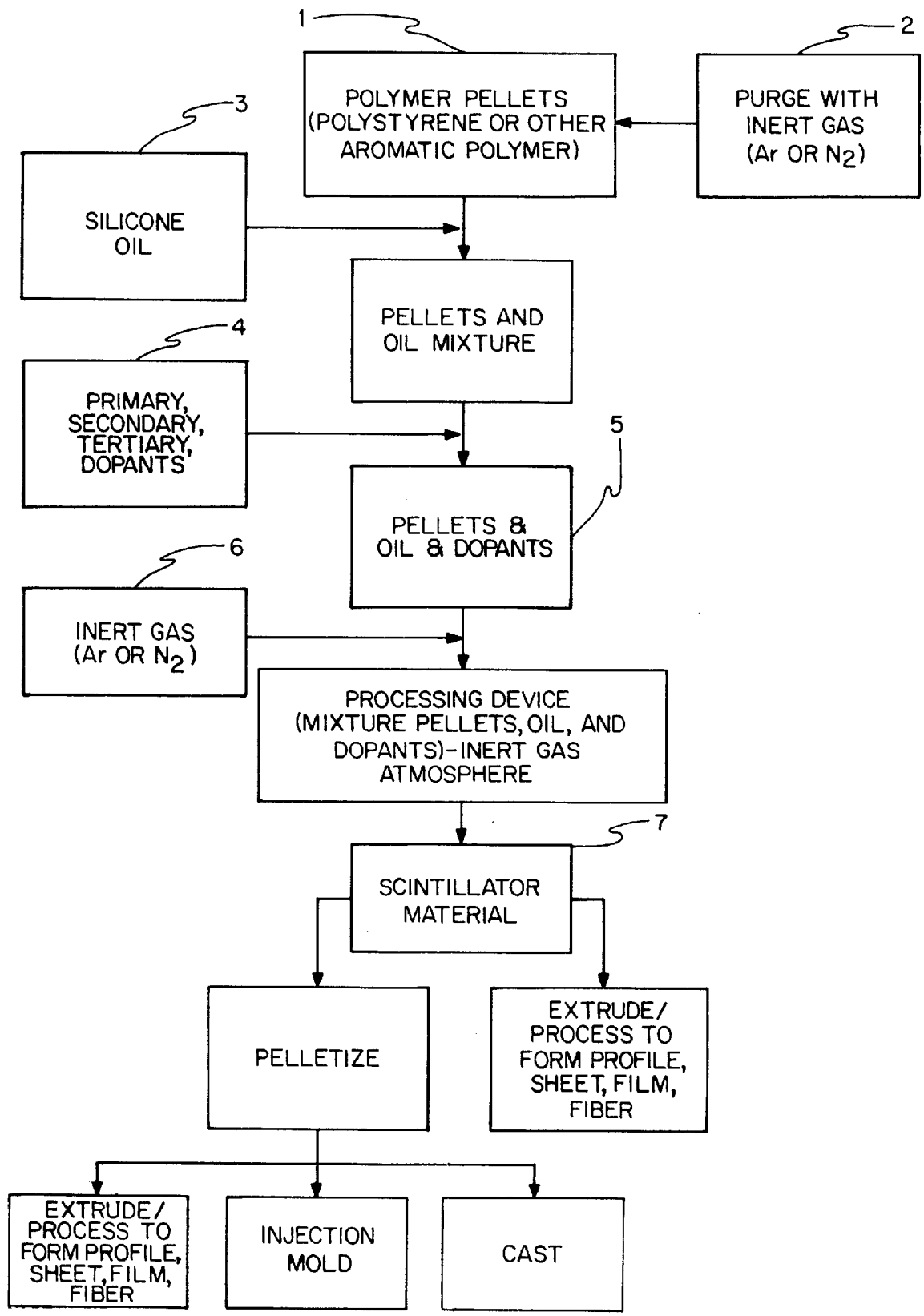
FIG. 1 is a schematic showing the process of employing the tumble-mix (multiple step) method for producing plastic scintillator material.

FIG. 1 depicts the method of making plastic scintillator material from a polystyrene stock together with all necessary dopants. A polymer, 1, preferably, virgin polystyrene pellets is received from the manufacturer. The polystyrene pellets are then purged with an inert gas, 2, which is argon or nitrogen in the preferred embodiment. The pellets are then placed in a mixing drum or some other container capable of holding and mixing the polymer pellets with several dopants: primary, secondary, tertiary, etc. Initially, silicone oil, 3, is added to the polystyrene pellets at typically 0.2–0.3% by weight according to the form of the dopant. The pellet-oil mixture is tumbled in the mixing drum for approximately five minutes. The drum is stopped and the dopants, 4, are added. The tumbling process is then continued for 5 to 10 minutes more until all of the pellets are evenly coated with the dopant. The combination of the polystyrene pellets, silicone oil, and the dopants, 5, is loaded into the hopper of an extruder. An inert gas, 6, preferably argon, is flowed over the pellet mixture to form a blanket over or atmosphere enclosing the pellets, oil and dopants. The presence of the argon gas in this step and in the previous step where the pellets were purged serves to drive out the water and oxygen which have a detrimental effect on the optical quality of the resulting scintillator. The extruder is energized and the polymer-dopant-silicone oil mixture is compounded to form a melt. This melt forms a solution where the solute, dopants, is uniformly dispersed in the solvent, polymer or resin, at the molecular level. Using this process, the resultant material is a true high-efficiency scintillator, ie, the energy transfer to the primary dopant from the solvent polymer, polystyrene in its excited state, is effectively accomplished. This yields a high efficiency scintillator where the optical quality of the base polymer is maintained. The compounded scintillator material, 7, can then be pelletized to produce high light yield plastic scintillator pellets which can be shaped into a final scintillator piece by various other processes, such as extrusion, injection molding, or casting. The scintillator material can also be directly extruded into film, sheet, profiles, or fiber without pelletization.

The use of a cool inert gas, either argon or nitrogen, shields the hot melt, formed from the processing of the polymer, silicone oil, and dopant mixture, from potential interactions with other reactive materials which may be present, ie $O_2$. Often, the gas is taken from the boil-off of a cryogen to assure that it is pure and cool. Argon is the preferred gas due to its mass which assures that it will displace other gases in the hopper, screw, and barrel of the extruder.

Argon, also, exhibits a cooling effect on the material in the hopper which helps to prevent the silicone oil and dopant coated pellets from sticking together which can cause "bridging" of the material above the barrel orifice, thus, stopping the flow of material. Commercial extruders can be used to process the mixture to form plastic scintillating material.

Figure 2:
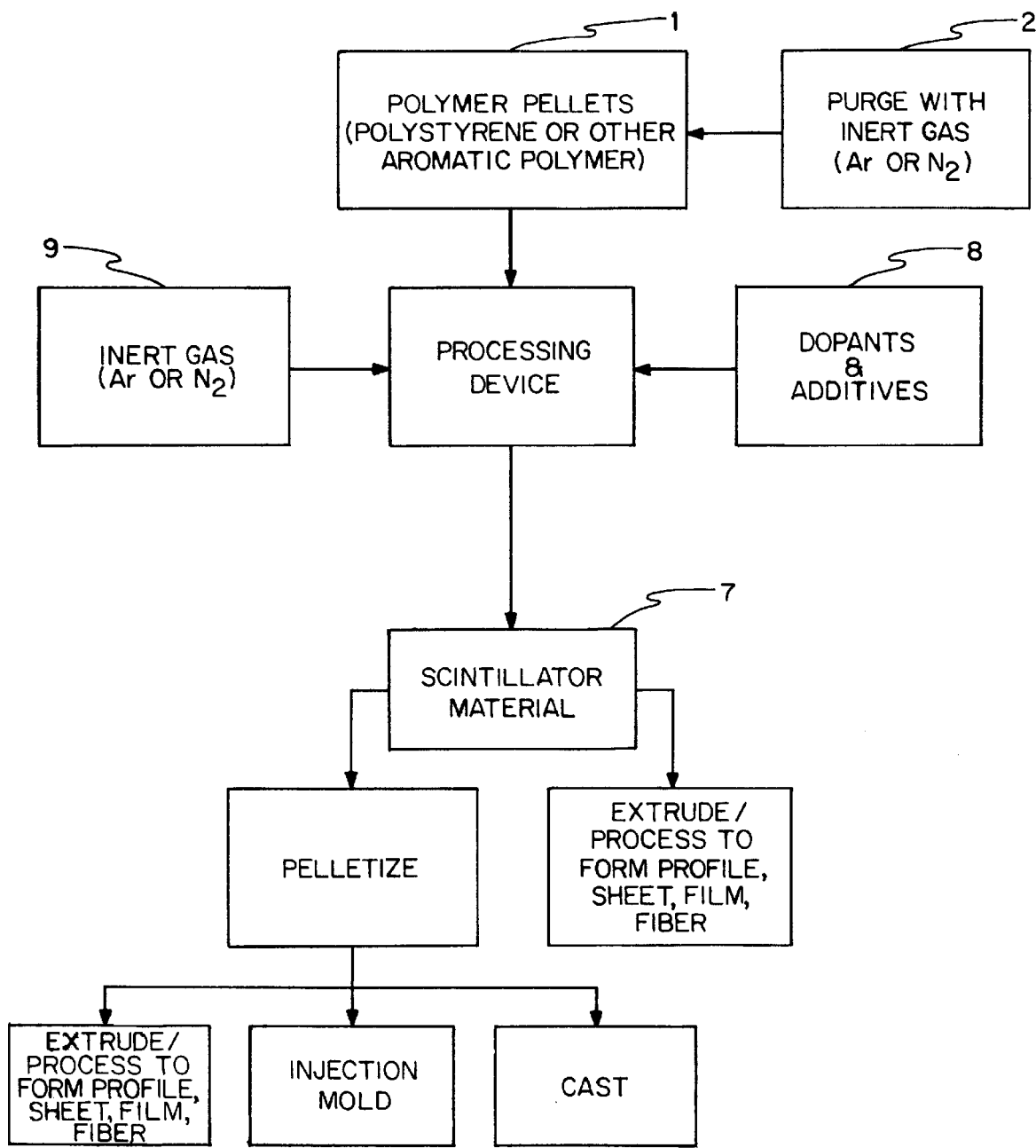
FIG. 2 is a schematic showing an inline-coloring or inline-doping (single step) process for the production of scintillator fibers, pellets, sheets, films, or profiles.

FIG. 2 represents an alternative method of producing scintillator in either profile or pellet form. Using this second method, a direct inline-color compounding and extrusion process achieves a wide range of production rates using a single process. This method can produce laboratory samples, or limited quantity high precision parts at rates as low as 10 lb/hr, or the process can be scaled up to high volume production rates of hundreds of pounds per hour. This single step process reduces the need for silicone oil (however silicone oil may still be added as a plasticizing agent) and eliminates the subsequent tumbling/mixing process. Instead, volumetric or gravimetric feeders are used to deliver the polymer, dopants, and inert gas directly to the processing device.

The method as represented by FIG. 2, also, reduces the risk of contamination and normal product loss which occur due to additional handling involved in a multistep process. Less contamination during processing results in longer optical path lengths. The plastic scintillating material formed by this method may be profiled, sheet or film formed, made into fiber, pelletized, or further shaped or molded by subsequent plastic forming operations.

As in the multiple step process, in the inline-coloring single step process, the polymer pellets, 1, are initially purged with an inert gas, argon or nitrogen but preferably argon, 2. The dopants, 8, scintillation couplers and wavelength shifters, are premixed in appropriate concentrations. The polymer, polystyrene pellets, 1, in the current enablement, is then mixed with or "colored" by the dopant mixture, 8, in a processing device preferably an inline-coloring extruding system under an inert gas atmosphere, 9. Silicone oil can also be added at this stage in the process. The inert gas, 9, employed is either argon or nitrogen preferably argon, and the dopants or organic compounds are added to the polymer, 1, or base resin by either gravimetric or volumetric metering. As in the earlier case, the extrusion process provides a plastic scintillating material, 7, in which the dopant, solute, is uniformly distributed in the solvent, polymer or resin, and as in the first method, this process functions in a commercial extruder.

The physical and chemical properties using either of the described methods are essentially the same except that the optical path length of the single step method may be longer due to reduced contamination in the processing steps. In addition, for both methods direct production of the final scintillator form is desirable. This is because total melt residence time is significantly reduced as compared to scintillator production via compounding, pelletization and then separate and subsequent plastic forming processes. This necessarily imparts two heat histories and greater total residence time to the product. Since high temperatures and long or multiple residence times may be harmful to the scintillation properties of the finished product, there is strong motivation for them to be avoided.

These methods for producing plastic scintillating material employ either two major steps (tumble-mix) or a single major step (inline-coloring or inline-doping). Using the two step method, the polymer pellets are mixed with silicone oil, and the mixture is then tumble mixed with the dopants necessary to yield the proper response from the scintillator material. The mixture is then placed in a compounder and compounded in an inert gas atmosphere. The resultant scintillator material is then extruded and pelletized or formed. When only a single step is employed, the polymer pellets and dopants are metered into an inline-coloring extruding system. The mixture is then processed under a inert gas atmosphere, usually argon or nitrogen, to form plastic scintillator material in the form of either scintillator pellets, for subsequent processing, or as material in the direct formation of the final scintillator shape or form.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A method for the production of a plastic scintillator material comprising:
    combining polymer pellets with a silicone oil to form a pellet-oil mixture in such a proportion that when mixed said silicone oil will coat said polymer pellets;
    tumble-mixing said pellet-oil mixture in a container so that said silicone oil coats said polymer pellets;
    combining organic scintillation couplers and wavelength shifters to form a dopant combination;
    adding said dopant combination to said previously tumbled pellet-oil mixture and tumble-mixing to form a final mixture where said dopant combination coats each oil-coated pellet;
    processing said final mixture in an inert gas atmosphere by means of a processing device to form a plastic scintillator material whereby during processing said dopant, as solute, is uniformly distributed at the molecular level, throughout the polymer, as solvent.

2. The method of claim 1 including producing said plastic scintillator material in a continuous process.

3. The method of claim 1 wherein said plastic scintillator material is extruded and pelletized to form high light yield plastic scintillator pellets.

4. The method of claim 1 wherein the plastic scintillator material is extruded directly into high light yield profiles, sheet, film, or fiber.

5. The method of claim 1 wherein said polymer pellets are polystyrene pellets.

6. The method of claim 1 where the polymer pellets is an aromatic polymer.

7. The method of claim 1 including purging said polymer pellets with an initial inert gas prior to their combining with said silicone oil to reduce the water and $O_2$ content of said polymer pellets.

8. The method of claim 7 wherein said initial inert gas is selected from a group consisting of argon and nitrogen.

9. The method of claim 1 wherein said inert gas is argon.

10. The method of claim 1 wherein said inert gas is nitrogen.

11. The method of claim 1 where said inert gas is selected from a group consisting of argon and nitrogen.

12. The method of claim 1 wherein said processing device is a single or multiple screw compounder.

13. The method of claim 1 wherein said processing device is an extruder.

14. A method for the production of a scintillator material having specific properties comprising:
    mixing organic scintillation couplers and wavelength shifters to form a dopant combination;
    metering said dopant combination into a processing device at a specified rate where said rate is dependent on the specific properties required of said scintillator material;
    metering additional additives into said processing device at a specified rate where said rate is dependent on the specific properties required of said scintillator material;

metering a plurality of polymer pellets into said processing device at a rate which is coupled to said specified rate for said dopants and said additives and where said polymer pellets mix with said dopant combination and said additives to form a dopant-pellet-additive mixture;

flowing an inert gas into said processing device so that said inert gas envelopes said dopant-pellet-additive mixture, thus, forming an inert atmosphere within said processing device;

activating said processing device to form a melt of said dopant-pellet-additive mixture where said melt resides in said inert atmosphere;

acting on said melt with said processing device to form the scintillating material where the scintillating material exhibits a uniform distribution of said dopant, as solute, in the polymer, as solvent, at the molecular level.

15. The method of claim 14 wherein said plastic scintillator material is extruded and then pelletized to form high light yield plastic scintillator pellets.

16. The method of claim 14 wherein said plastic scintillator material is extruded directly into high light yield profiles, sheet, film, or fiber.

17. The method of claim 14 wherein said polymer pellets are polystyrene pellets.

18. The method of claim 14 where the polymer is an aromatic polymer.

19. The method of claim 14 including purging said polymer pellets with an initial inert gas prior to being metered into said processing device.

20. The method of claim 19 wherein said initial inert gas is selected from the group consisting of argon and nitrogen.

21. The method of claim 14 where said inert gas is argon.

22. The method of claim 14 where said inert gas is nitrogen.

23. The method of claim 14 where the inert gas is selected from a group consisting of argon and nitrogen.

24. The method of claim 14 wherein said processing device is an extruder.

25. The method of claim 14 wherein said processing device is a single or multiple screw compounder.

26. The method of claim 14 where the production of said scintillator material is a continuous process.

* * * * *